United States Patent Office 3,503,928
Patented Mar. 31, 1970

3,503,928
PROCESS FOR PREPARING HIGH MOLECULAR WEIGHT POLYIMIDES FROM AMMONIUM DI-CARBOXYLIC ACID ANHYDRIDE COMPOUNDS
Heinrich Gilch, Krefeld-Bockum, and Hermann Schnell, Krefeld-Uerdingen, Germany, assignors to Farbenfabriken Bayer Aktiengesellschaft, Leverkusen, Germany, a corporation of Germany
No Drawing. Filed July 17, 1968, Ser. No. 745,401
Claims priority, application Germany, July 26, 1967,
F 53,059
Int. Cl. C08g 20/32
U.S. Cl. 260—47          7 Claims

ABSTRACT OF THE DISCLOSURE

High molecular weight polyimides consisting essentially of recurring structural units of the formula

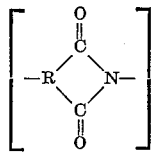

wherein R represents an aromatic radical in which the two C=O-groups are attached to two adjacent carbon atoms, and the process for the production of these polyimides by polycondensing an aromatic compound which contains an ammonium group and a cyclic carboxylic acid anhydride group in a polar organic solvent in the presence of an organic base to give a polyamidocarboxylate and heating said polyamidocarboxylate at temperatures from 120 to 300°C.

---

This invention relates to high molecular weight polyimides and to a process for their preparation.

It is already known that polyimides may be prepared by reacting tetracarboxylic acid dianhydrides with diamines. At low temperatures, polymeric amidocarboxylic acids are found in polar solvents, water is split off by heating or by chemical means and polyimides are formed. Exactly stoichiometric quantities have to be used in this process. Even slight deviations therefore lead to large molecular weight variations. If, for example, local overheating occurs during the reaction of the dianhydride with the diamine, water may be formed by imide formation. The carboxylic acid anhydride is then hydrolysed so that the process of polyaddition is stopped. Similar difficulties occur, if instead of using the dianhydrides, the corresponding esters are used. It is difficult to prepare high molecular weight amidio esters without the imides being simultaneously formed by cyclisation, thus greatly reducing the solubility of the polymer. The preparation of polyimides from aminodicarboxylic acid esters is inconvenient and commercially difficult to carry out.

It is an object of this invention to provide high molecular weight polyimides being extremely stable at high temperatures consisting essentially of recurring structural units of the general formula

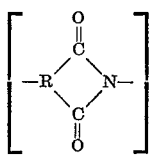

wherein R represents an aromatic radical in which the two C-groups $$\overset{\parallel}{\underset{O}{}}$$

are attached to two adjacent carbon atoms.

It is another object of this invention to provide a process for the production of high molecular weight polyimides which comprises (a) polycondensing an aromatic compound which contains an ammonium group and a cyclic carboxylic acid anhydride group in the molecule to give a polyamidocarboxylate, and (b) heating said polyamidocarboxylate to give a polyimide, said polycondensing being effected in a polar organic solvent in the presence of at least 2 mols of an organic base, based on one mol of carboxylic acid anhydride, at temperatures of from −20 to +100° C. said heating being effected at temperatures of from 120 to 300° C. for 5 to 60 minutes.

The second step (b) of the polyimide forming reaction may also be carried out after first precipitating and redissolving the polyamido carboxylate.

Aromatic compounds which contain one ammonium and one cyclic carboxylic acid anhydride group in the molecule are, for example, compounds of the general formula

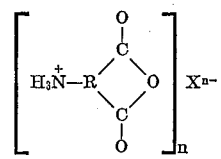

wherein R has the meaning as given above, X⁻ represents an anion and n represents the integer 1 or 2.

In particular, R may represent a radical which has been derived from benzene, naphthalene, diphenyl, anthracene, diphenylether, diphenylketone, diphenylsulphone, diphenylmethane or diphenylthioether. The radicals may also be substituted by inert groups such as halogen (chlorine) or alkyl (methyl, ethyl. The $\overset{+}{N}H_3$ group may be situated in any position of the aromatic residue. X⁻ is preferably an inorganic anion such as the halide (chloride) or sulphate ion or an organic anion such as trichloroacetate or toluenesulphonate, n denotes the valency of the anion and is preferably 1 or 2.

Examples of these compounds are the chloride of 4'-ammonium diphenylether - 3,4 - dicarboxylic acid anhydride, the chloride of 1-ammonium-naphthalene-3,4-dicarboxylic acid anhydride, the chloride of 3- or 4- ammonium phthalic acid anhydride, the sulphate of 3'-ammonium diphenyl-3,4-dicarboxylic acid anhydride, the chloride of 1 - ammonium - 8 - chloronaphthalene - 3,4-dicarboxylic acid anhydride, the sulphate of 4'-ammonium-diphenylsulphone-3,4-dicarboxylic acid anhydride, and the 3'-methyl-toluenesulphonate of 5'-ammonium - diphenylketone-3,4-dicarboxylic acid anhydride. Preferably the chloride of 4'-ammonium-4-phenoxyphthalic acid anhydride is used in the process according to the invention.

Particularly suitable organic bases include aliphatic and aromatic tertiary amines such as triethylamine and pyridine. At least two equivalents of these bases are used per mol of carboxylic acid dianhydride. The base may quite well be used in excess.

The solvents used are polar organic solvents, e.g. excess of base (pyridine is especially advantageous) or dimethylformamide, dimethylsulphone, dimethylsulphoxide, or dimethylacetamide. The solutions of the starting compounds are generally used in concentrations of 5 to 40% by weight.

The first stage of the process is generally carried out by dissolving or suspending the compound which contains ammonium and carboxylic acid anhydride groups in the solvent, adding the amine (if the amine has not been used as solvent), and carrying out the polymerisation reaction at temperatures of between −20 and +100° C., preferably at 10° to 40° C. One may usually simply leave the reaction mixture to stand at room temperature. The reaction time may vary between a few minutes and several hours, e.g. 5 minutes to 10 hours. A solution of a polyamidocarboxylate results. This solution can in many cases be converted into the polyimide by heating, evaporating off the solvent. Coating materials such as lacquers or films are preferably prepared in this manner. The usual additives for lacquers, such as pigments, may be added to the solutions. Heating is generally carried out at temperatures of between 120 and 300° C. for about 5 to 60 minutes, the temperature preferably being increased during the course of the reaction, and particularly towards the end of the reaction time when higher temperatures within the given range are desirable. The reaction may advantageously be carried out under a protective gas atmosphere, e.g. of nitrogen.

The amidocarboxylic acids may also be precipitated from the amidocarboxylate solutions of the first reaction stage with acids (for example acetic) and be isolated in solid form. They may be washed and dried and can be stored in solid form. They are converted into polyimides by being redissolved in one of the solvents mentioned above and treated as described above.

The process according to the invention may be represented by a reaction scheme given below by way of example:

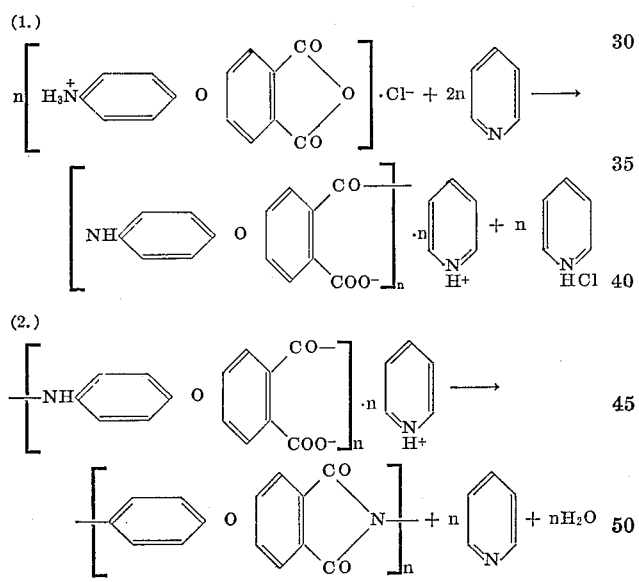

The following examples are to further illustrate the invention without limiting it.

EXAMPLE 1

58 g. of the dimethyl ester of 4'-nitro-4-phenoxyphthalic acid are dissolved in 116 ml. of methanol and hydrogenated in the presence of Raney nickel at 70° C. in a vibratory autoclave. After removal of the catalyst, the solution is concentrated by evaporation and the residue is recrystallised from methanol. Yield 46 g. of 4'-amino-4-phenoxyphthalic acid dimethylester, M.P. 93–94° C.

Analysis.—Calculated (percent): C, 63.8; H, 4.6; O, 26.6; N, 5.0. Found (percent) C, 63.5; H, 4.7; O, 26.6; N, 4.8.

The dimethyl ester of 4'-amino-4-phenoxyphthalic acid is saponified in a methanolic solution of potassium hydroxide under reflux in an atmosphere of nitrogen. The hydrochloride of 4'-amino-4-phenoxyphthalic acid is prepared by introducing the methanolic solution dropwise into a mixture of 50% water and 50% concentrated hydrochloric acid, and it is then recrystallised from water. 5 g. of the hydrochloride of 4'-amino-4-phenoxyphthalic acid are suspended in purified thionyl chloride at room temperature and stirred until no further evolution of gas can be observed (6 to 8 hours). The thionyl chloride is removed by evaporation and the chloride of 4'-ammonium-4-phenoxy-phthalic acid anhydride remaining behind is dissolved in 25 ml. of anhydrous pyridine without further purification and stirred for 4 hours at 25° C. A viscous solution is obtained which is divided into two halves. One half is poured on a glass plate and heated under nitrogen, first at 150° C. for one hour and then at 300° C. for 30 minutes. The resulting film can withstand temperatures above 400° C. without visible damage. The second half of the solution is introduced dropwise into dilute acetic acid and the resulting precipitate of polyamidocarboxylic acid is filtered off, washed with methanol and water and dried under vacuum. The product can be stored for some time in this form. 1 g. of the polyamidocarboxylic acid is dissolved in 4 ml. of dimethylformamide and converted as described above into a polyimide film which has the same properties. Heat distortion temperature: 560° C.

EXAMPLE 2

5 g. of the chloride of 4-ammonium-phthalic acid anhydride are dissolved in 20 ml. of pyridine. The solution is stirred for 4 hours at 25° C., during which time there is a great increase in its viscosity. The polyamidocarboxylic acid is isolated by precipitation with dilute acetic acid. The acid is dissolved in a mixture of 15 ml. of dimethyl formamide and 5 ml. of pyridine and is converted into the polyimide by the method described in Example 1.

3-ammonium-phthalic acid anhydride or a mixture of the 3-ammonium and the 4-ammonium compound can be used in place of the chloride of 4-ammonium-phthalic acid anhydride with equal success.

What we claim is:

1. A process for the production of high molecular weight polyimides which comprises
   (A) polycondensing in a polar organic solvent in the presence of at least two mols of a tertiary amine at temperatures of −20 to +100° C., an aromatic compound of the formula

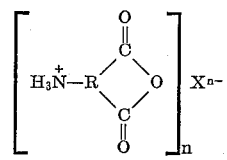

wherein R is an aromatic radical of the benzene, naphthalene, diphenyl, anthracene, diphenylether, diphenylketone, diphenylsulfone, diphenylmethane or diphenylthioether series in which the two C=O groups are attached to adjacent carbon atoms, n is 1 or 2 and $X^n$ denotes an anion of valence n, and
   (B) heating said polyamidocarboxylate at temperatures of from 120 to 300° C. for 5 to 60 minutes to form a polyimide.

2. The process of claim 1 wherein the aromatic radical R is substituted with an inert substituent selected from halogen and alkyl.

3. The process of claim 1 wherein the aromatic radical R is substituted with an inert substituent selected from chlorine, methyl and ethyl.

4. The process of claim 1 wherein said anion is a halide, sulfate, trichloroacetate, or toluenesulphonate.

5. Process of claim 1 wherein said aromatic compound is the chloride of 4'-ammonium diphenylether-3,4-dicarboxylic acid anhydride, the chloride of 1 - ammonium-naphthalene-3,4-dicarboxylic acid anhydride, the chloride of 3- or 4-ammonium diphenyl-3,4-dicarboxylic acid anhydride, the chloride of 1-ammonium - 8 - chloronaphthalene-3,4-dicarboxylic acid anhydride, the sulphate of 4'-ammonium-diphenylsulphone - 3,4 - dicarboxylic acid anhydride or the 3'-methyl-toluenesulphonate of 5'-ammonium-diphenylketone-3,4-dicarboxylic acid anhydride.

6. The process of claim 1 wherein said tertiary amine is triethylamine or pyridine.

7. The process of claim 1, wherein said aromatic compound being the chloride of 4' - ammonium-4-phenoxyphthalic acid anhydride.

References Cited
UNITED STATES PATENTS

| | | | |
|---|---|---|---|
| 3,391,120 | 7/1968 | Fritz | 260—63 |
| 3,414,546 | 12/1968 | Werntz | 260—78 |

WILLIAM H. SHORT, Primary Examiner

L. L. LEE, Assistant Examiner

U.S. Cl. X.R.

260—65, 78, 78.4